May 24, 1949.            H. F. LUCH            2,470,823
DEER CALL
Filed May 6, 1947
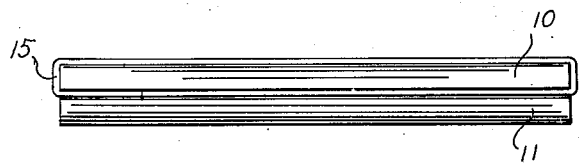
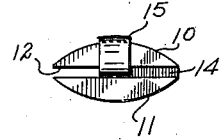
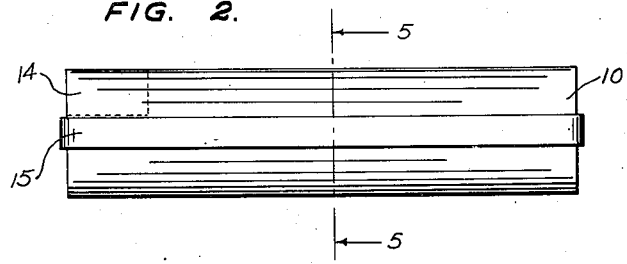
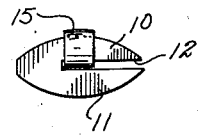
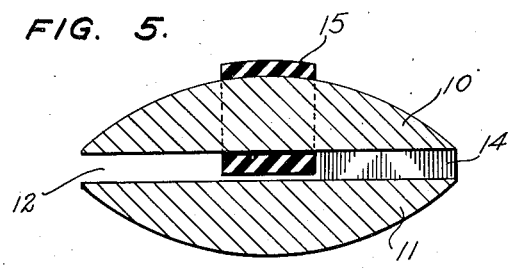
HENRY F. LUCH, Inventor
By McMorrow, Berman & Davidson
Attorneys Patented May 24, 1949

2,470,823

UNITED STATES PATENT OFFICE 2,470,823

DEER CALL

Henry F. Luch, Portland, Oreg.

Application May 6, 1947, Serial No. 746,393

1 Claim. (Cl. 46—180)

This invention relates to a deer call.

Hunters frequently resort to imitations of animal calls for the purpose of enticing them out into the open where they can be snared or killed. The particular device that is the subject matter of this invention is designed to imitate the call of the deer.

The accompanying drawings illustrate a preferred embodiment of the invention, but it is understood that modifications may be made therein without departing from the spirit of the invention as hereinafter claimed.

Figure 1 is a front elevation of the deer call.

Figure 2 is a top plan view thereof.

Figure 3 is a right-hand elevation.

Figure 4 is a left-hand elevation.

Figure 5 is a vertical section taken on the line 5—5 of Figure 2.

The deer call comprises two semi-elliptical members 10 and 11, having their curved surfaces oppositely disposed and their flat surfaces spaced from each other for the major portion of their length to form a slot 12. The two members 10 and 11 are elastically joined to each other at one corner 14, preferably integrally. The members 10 and 11 may be made of metal or plastic but it has been found that for the purposes of the invention wood serves admirably.

A rubber band 15, longitudinally encircling the upper member 10 and positioned within the slot 12, constitutes the reed.

The hunter may utilize the device by blowing into the slot 12 either through the front or through the back. There will, of course, be a slight difference in sound because of the different size of air passage, due to the support 14. The pitch may be further controlled by compressing the members 10 and 11 to vary the space between them.

When the rubber reed 15 is broken, it can be easily replaced.

Due to its construction, the device can be blown in either the upright or reverse position.

Despite the extreme simplicity of its construction, this device has been proved to be very effective in enticing deer.

What is claimed is:

In a deer call comprising two substantially coextensive elongated members spaced apart and one of said elongated members having an endless resilient elastic reed encircling the same with a length of the reed disposed in the space between both elongated members, the features which include having the inner facing sides of both elongated members flat and substantially parallel and each member externally arcuately convex in form transversely of the longitudinal dimension thereof, means integrally securing said two elongated members together at one end only thereof between the facing sides along one longitudinal side edge thereof in such fashion as to close the space between said members at said end while the correspondingly-opposite longitudinal side edges and opposite end remain open, and having the endless resilient elastic reed longitudinally disposed with respect to the one elongated member upon which it is mounted and extending longitudinally through the space between said two members from one end to the other thereof intermediate the facing flat sides of said two members.

HENRY F. LUCH.

REFERENCES CITED

The following references are of record in the file of this patent:

UNITED STATES PATENTS

| Number | Name | Date |
|---|---|---|
| 626,827 | Draughon | June 13, 1899 |
| 918,835 | Fawkes | Apr. 20, 1909 |
| 1,434,910 | Murphey | Nov. 7, 1922 |
| 1,646,530 | Ferretti | Oct. 25, 1927 |
| 2,182,692 | Harbin | Dec. 5, 1939 |